United States Patent [19]

Fuller et al.

[11] 3,714,650

[45] Jan. 30, 1973

[54] VEHICLE COMMAND AND CONTROL SYSTEM

[75] Inventors: Roger L. Fuller, Stow; Sven G. Gustafsson, Framingham; Derek V. Harris, Acton; Robert K. Kaye, Framingham; Joseph J. Oliver, Allston, all of Mass.

[73] Assignee: Raytheon Company, Lexington, Mass.

[22] Filed: July 30, 1970

[21] Appl. No.: 59,504

[52] U.S. Cl. ............343/6.5 LC, 343/6.5 SS, 343/15
[51] Int. Cl. ................................................G01s 9/56
[58] Field of Search..........343/6.5 R, 6.5 LC, 6.5 SS, 343/15

[56] References Cited

UNITED STATES PATENTS

| 3,611,379 | 10/1971 | Deckett | 343/6.5 LC |
| 3,223,998 | 12/1965 | Hose | 343/6.5 LC |
| 3,474,460 | 10/1969 | Huebscher | 343/6.5 LC |
| 3,343,163 | 9/1967 | Crooks et al | 343/6.5 R |

*Primary Examiner*—Benjamin A. Borchelt
*Assistant Examiner*—N. Moskowitz
*Attorney*—Milton D. Bartlett, Joseph D. Pannone and David M. Warren

[57] ABSTRACT

A dual frequency ranging and communication system for communicating with and locating mobile vehicles in a multipath environment such as an urban center. This system functions in urban areas for both communication and ranging where line of sight radiation techniques may not properly function. A plurality of remote relay stations are located at points throughout the urban area, each station receiving and transmitting coded digital data and tone signals, the tone signals being used for phase ranging. Each of the vehicles is equipped with a transponder responsive only to the radio signal having a formatted message including the vehicle identification code with a ranging tone suitably impressed thereon. The formatted signal is transmitted from one of the relay stations at a first frequency and picked up by a preselected number of other relay stations as well as by the vehicle transponder. The vehicle transponder in turn generates a reply signal at a second frequency containing message data and a tone signal modulated on the second frequency for use in ranging, all of which signals are processed at a central location.

24 Claims, 5 Drawing Figures

VEHICLE COMMAND AND CONTROL SYSTEM

REFERENCE TO RELATED CASES

Application Ser. No. 19,190 filed Mar. 13, 1970, of Joseph E. Bryden titled Visual Display System and U.S. Pat. No. 3,633,169, issued Jan. 4, 1972, of William J. Bickford titled Demand Access Digital Communications System are both assigned to the same assignee as the present application and are hereby incorporated herein by reference.

BACKGROUND AND SUMMARY OF THE INVENTION

This invention relates to the command and control of a large number of mobile vehicles, for example surface vehicles, such as police and emergency vehicles, and rapid transit buses, and more particularly to the communication with and location of such vehicles in high clutter signal environments which are characteristic of urban centers having tall buildings.

In conventional two-way voice communications systems, a mobile radio telephone in each vehicle communicates with a central base station. A few remote relay stations are used when necessary in weak signal areas. In such systems a typical radio signal channel has a limited capacity for handling vehicles, which means that as the system expands additional channels are required which channels may not be available because of the frequency allocation policies of the government coupled with high demand. Additionally, receiver monitors may be required at the base station for each channel and only manual rather than automatic position location and schedule adherence is possible. Additionally, the presence of such a large number of signal sources arriving at a central point increases the probability of signal blockage. Additionally, the drivers handling of the vehicle must be disturbed to operate the radio.

An additional problem inherent in single frequency systems of the prior art is that transmissions can not occur simultaneously between a relay station and a vehicle, and the vehicle and the relay station; however, by utilizing the two frequency method of the present invention, simultaneous transmission of the ranging signal both ways between the relay station and the vehicle halves the time for measurement or correspondingly doubles the sampling rate of the system thereby allowing an increased number of vehicles to be serviced without a corresponding increase in a time required for transmission to the vehicles. To accommodate both the location and communication functions in the control systems, a class of systems called distributed roadside systems has been employed. These systems require the installation of equipment, either buried in the road or adjacent to the road on a post, the function of which is to establish the position of a nearby vehicle since the position of the roadside equipment is known. Reference may be made to U.S. Pat. No. 2,597,517 to D.E. Nobel issued on May 20, 1952 and U.S. Pat. No. 2,790,071 issued to D.L. Gunn on Apr. 23, 1957.

Distributed roadside systems may be divided into two groups, the first group requiring the vehicle to transmit its identity to the roadside equipment by radio with the roadside equipment receiving this signal and retransmitting the vehicle identity by, for example, direct telephone lines to a control center; while the second group operates in a converse manner. In this situation the roadside equipment transmits its equipment identity code to the vehicle by radio. The vehicle retransmits both the code of the roadside equipment and its vehicle identity by radio directly to a common control station. In both groups the accuracy of location of vehicles is directly related to the number and location of the roadside equipments. The more accurate the location, the more roadside equipments are needed. As an additional disadvantage, flexability is limited because the vehicle must pass close to the roadside equipment in order to be detected.

The prior art also discloses a number of vehicle location systems based upon triangulation from a number of known points. Attention is directed to U.S. Pat. No. 2,470,787 issued to P.W. Nosker on May 24, 1949 relating to a system for determining the position or path of objects in space. This system uses a plurality of ranging stations for phase ranging upon an airborne vehicle equipped with a transponder. No mention is made of treating the effects of multipath caused by the CW wave bouncing back from the ionsphere.

In the contemporary art phase ranging of a vehicle in space has taken the form of high frequency highly directed antennas and propogation patterns. Additionally, the problems of multipath are in part avoided by using directive antennas and by pointing them skywards. In this regard, reference is made to the Institute of Radio Engineers Transactions on Antennas and Propogation, October 1955 on pages 185–192 in an article entitled "Multipath Phase Errors in CW FM Tracking Systems" by T.E. Solenberger.

Multipath effects are greatly reduced in the present system due to the diversity combination technique utilized with the dual frequency system of the present invention. This technique is described in detail in U.S. Pat. No. 3,471,788 to W.J. Bickford et al., and is assigned to the same assignee as the present invention.

It is therefore an object of this invention to provide a dual frequency ranging system for use with mobile vehicles in which phase stable oscillators are not required either in the vehicles or at the relay station.

It is an additional object of this invention to provide a dual frequency ranging system in which interrogation signals are sent to a vehicle at one frequency and the response from the vehicle is at another frequency.

It is an additional object of this invention to provide a system for command and control of a fleet of mobile surface vehicles in a high multipath signal environment especially in urban areas.

It is an additional object of this invention to provide for the location and communication functions between and among vehicles and a remote station utilizing similar equipment by means of single transmissions from the vehicle.

It is yet an additional object of this invention to provide a system for the efficient utilization of the limited bandwidth available to mobile vehicle voice radio communication channels. Relately, it is desired that the system permit vehicle location to be within a high order of accuracy.

It is yet another object of this invention to utilize digital coding in the ascertainment of vehicle location and communication on a repetitive or cyclical basis in a vehicle fleet expandable to several thousand units.

The aforementioned objects and advantages are satisfied in an embodiment comprising a common control arrangement and a plurality of remote relay stations, each station being capable of signal transmission and reception or reception only, and including means for communication with the control arrangement and the plurality of transponders located in corresponding vehicles, each transponder being operable upon receipt of a suitable coded digital signal transmitted from remote stations.

Continuous location and coded digital communications using a standard UHF radio channel are provided in which location is derived from a series of phase range difference measurements with respect to the vehicles and relay stations. The control center transmits a digital signal containing a vehicle identification code, and a coded digital message if one is required to be transmitted to the relay station selected as a master station via a telephone data channel. The master station then transmits the digital signal together with a range tone as modulation on the UHF radio carrier. The radio signal is received by all relay stations and vehicles within range of the master station; however, only the vehicle identified by the particular code transponds the received range tone as modulation on the other frequency of the same duplex radio channel. The transponded tone is compared in phase with the master station and at those relay stations receiving it with the original range tones transmitted by the master station.

The phase difference measurements are then transmitted to the control center computer via the relay stations telephone data channels where they are processed and the vehicle location determined. The relay stations are arranged in an approximately square matrix across the area of operation with an interstation spacing, for example, of 3 miles in the dense downtown central area and 7 miles over the remainder of the area. This arrangement provides a range measurement for each vehicle location by at least four relay stations with a resultant location accuracy within 600 feet with 95 percent probability of correctness. More measurements may be conducted when necessary in an emergency to provide for an accuracy of location within 300 feet with 95 percent probability of accuracy.

Real time data is provided to dispatchers via cathode ray tube display consoles such as the display described in the Bryden application, and their decisions, commands, or requests for direct communication with the vehicles may be made through the keyboard of the same console. Data provided by the vehicle fleets can be stored, processed and operated upon by the individual control center computers for a large variety of system operation requirements which are necessary for the effective operation of a large fleet.

The invention contemplates means at one of the remote relay stations under control of the common control arrangement for transmitting an omnidirectional signal with coded indicia modulated thereon, means at selected transponders responsive only to the coded indicia for generating an omnidirectional coded reply signal after receipt of the transmitted signal and receiving means at the remote relay station for detecting and decoding the original transmitted signal and the reply signal and further including means for communicating the decoded reply signal to the common control arrangement.

Specifically, the ranging system of the present invention employs a full duplex radio channel having two radio frequency channels spaced about five megacycles apart. Of course, the frequency channels spacing may be as wide or as narrow as desired. The frequency spacing is wide enough to avoid interference between the two signal frequencies. The master relay station uses one of these frequencies, for example, $f_1$ and transmits data and ranging tone signals modulated thereon to the vehicle and to the corresponding relay stations. That vehicle which is selected by a specific identification code signal responds by immediately retransmitting the same tone or ranging signal back to the relay station modulated on a second carrier frequency, for example, $f_2$. Thus each relay station and the master station, which may be one of the relay stations in the computer selected group, receives two identical tone signals whose phase delays are related to the distances between each station and the location of the signal source. These phase difference measurements are then coded and sent via telephone link to a central computer which may be at the master relay station or at a central location. The computer then calculates the vehicle best estimate location and sends the results to output indicating and storage devices such as digital displays and alphanumeric printouts. Thus, a system is provided whereby vehicle information and location is centralized and accessible by means of signals received at a plurality of relay stations from the plurality of vehicles, such that the central location is aware of the location of any vehicle at any given time. Because the vehicle transmissions at $f_2$ once received at the plurality of relay stations are relayed to the central location and the central computer by telephone links, there can be no interference between the signals from the various relay stations, hence the vehicle location may be calculated by means of an algorithm containing the various phase differences of the modulation at the second frequency and the modulation at the first transmitted frequency at each of the relay stations as will be explained.

The control center which has a central computer with associated peripheral equipment such as visual displays and hard copy printers connected to the relay stations by full duplex telephone data channels, automatically controls the total system on a sequential basis at a rate of, for example, one vehicle communication location every thirty milliseconds. It decides the order in which the vehicles are to be interrogated and selects the best group of relay stations, usually those closest to the vehicle, on which location and communication operations will be performed. If the approximate location of the vehicle being interrogated is unknown, the computer may systematically search the entire urban area until the location is established. Successive location determinations of the vehicle can then be performed in intervals sufficiently small that the computer can retain the approximate location in its storage and the selection of the appropriate group of relay stations can be made without again going through a searching mode.

The ineffective voice communication use of already scarce radio channels is alleviated by the provision of an integrated coded digital communication and phase ranging location system utilizing only a duplex UHF radio channel. The basic system can locate and communicate with up to 2,000 vehicles per minute, however, should a higher rate be desired additional channels can be utilized together with additional transmitter-receivers at the relay stations.

BRIEF DESCRIPTION OF THE DRAWINGS

Further objects and advantages of the invention will become apparent from the following specifications taken in connection with the accompanying drawings, wherein like reference characters identify parts of like function throughout the different views thereof.

DESCRIPTION OF THE PREFERRED EMBODIMENT

Figure 1:
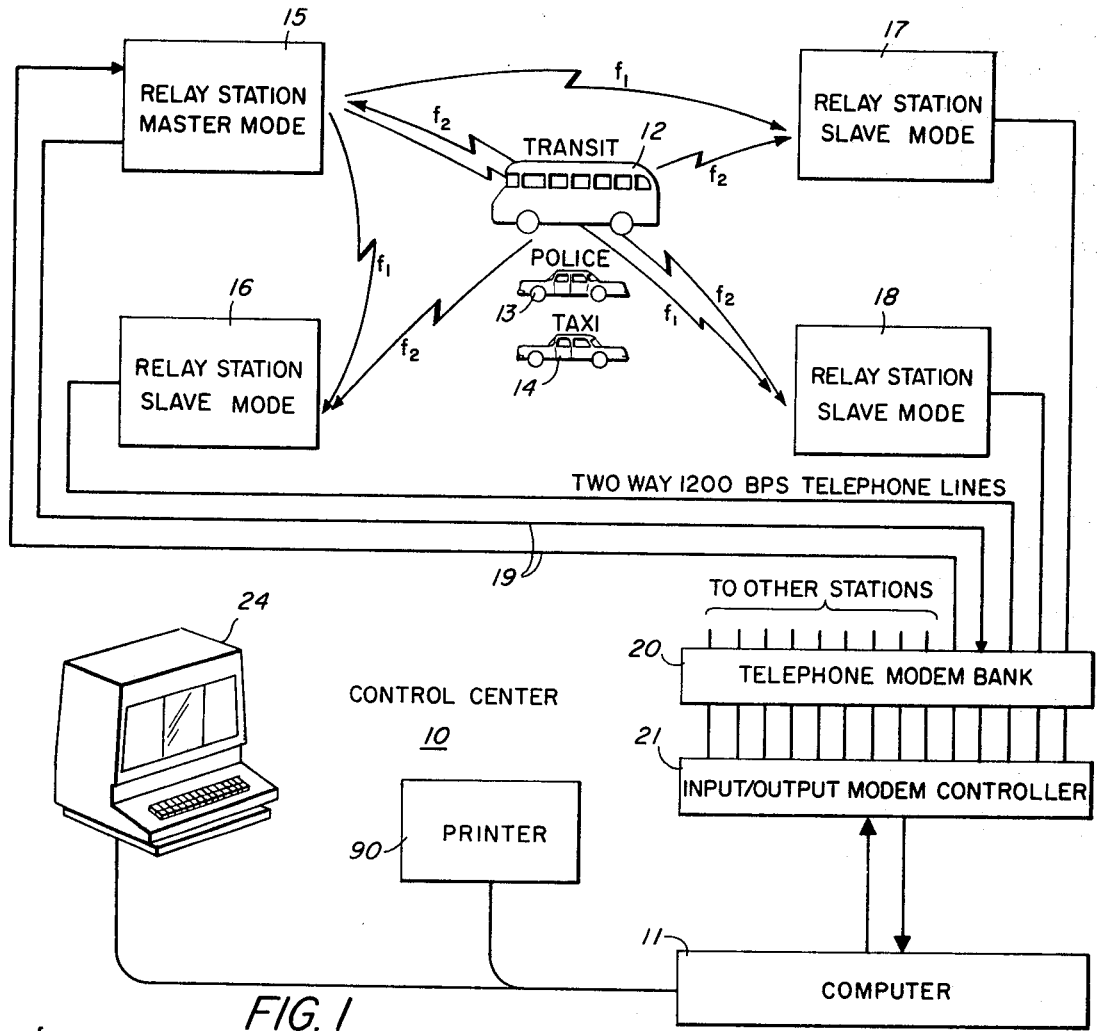
FIG. 1 is a block diagram of a communication and location system in accordance with the present invention which is illustrative of a location operation.

Referring now to FIG. 1, there is shown a vehicle control ranging and communication system in accordance with the present invention wherein the location operation is illustrated. The control center shown generally at 10 contains a central computer 11, such as Raytheon Model 704, which transmits a message containing the identity code of the particular vehicle with which communication is required or desired. Each vehicle in a fleet of vehicles, such as transmit buses, police cars, or taxi cabs shown as 12, 13, and 14 respectively, has a particular and unique identity code comprised of digits to which a transponder in that particular vehicle and only the transponder in that particular vehicle responds.

The transponder (not shown) is activated sequentially along with the other transponders in other vehicles in their respective fleets of transit buses, police cars and/or taxis or any other vehicles which may be present in the system.

The control center 11 transmits a digitally coded message to a master relay station 15 which is identical to slave relay stations 16, 17 and 18 except for the presence of a transmitter as will be explained. This message is transmitted via telephone land lines which, for example, may comprise 1,200 bit per second two-way telephone lines 19 over which data may be exchanged between the computer and the master relay station through telephone modem bank 20 which is controlled by an input output modem controller 21 for buffering data into and out of computer 11. The telephone modem bank 20 and modem controller 21 are of well known design, for example, the modem controller may be similar to that shown in the copending application of William J. Bickford. The modems themselves, representatively shown at 20, are of standard manufacture such as made by Western Electric, Milgo Electronics, or Rixon Corp. Once this message is received over line 19 at the master relay station 15, it is transmitted with a ranging tone modulated thereon which in the present embodiment may preferrably be 2,700 hertz as frequency modulation on an RF carrier of frequency $f1$ in the UHF region, for example, 460 megahertz.

This transmitted signal is received by all relay stations and vehicles within range of the master station. In the embodiment shown in FIG. 1 these are relay stations 16, 17 and 18 and vehicles 12, 13 and 14. However, only the vehicle whose identity code was transmitted will retransmit (transpond the 2,700 hertz ranging time received from the master station). This retransmission occurs as modulation on the other RF carrier at frequency $f_2$ of the allocated duplex UHF channel where $f_2$ is ideally approximately 5 megahertz displaced in frequency from $f_1$; however, of course, the frequency displacement maybe other than 5 megahertz. The signal transponded from the vehicle is received at the master relay station and the other relay stations in the area.

A phase measurement is made at the master relay station 15 and each of the relay stations 16, 17 and 18 within range, with the vehicle range determined by the phase difference between the ranging tone received from the master station and that received from the vehicles on their respective frequencies, $f_1$ and $f_2$. These phase differences are proportional to the difference of path length traveled by the two transmissions. Since the relay station locations are known to the computer the position of the vehicle can be determined in accordance with the algorithm to be described.

The reply signal received from he vehicles is a digitally coded signal which is substantially omnidirectionally retransmitted within a predetermined time after receipt of the transmitted signal at the frequency of the associated duplex radio channel. Each reply signal at $f_2$ includes coded data and a ranging signal modulated on $f_2$. A synchronization signal may or may not be transmitted from the vehicle. The composition of the individual coded signals is more completely described with reference to FIGS. 4 and 5 in which figures the spacing and timing of these replay signals is also illustrated.

A number of relay stations receive the original transmission as well as the transponded signal. Consequently, when the reply signals at frequency $f_2$ from the vehicles are received at the stations the relative phase of the ranging signals may be measured and the measurement transmitted back to the common control center 10. This relative phase measurement is of course related to the distance between the remote relay station and the vehicle transponder.

The relative phase measured is perturbed by a number of phenomenon, the major one being that of multiple signal reflections from buildings and other objects in a major city. The relative phase, as previously described, is measured at each of number of relay stations and when these measurements are incorporated into a location computation using the algorithm to be described which is based on inverse hyperbolic minimum variance principles, the vehicle location is described. An important attribute of this algorithm it that it results in the cancelation of mean relative phase errors due to multiple path reflections, transponder phase shift, noise received at and generated by the transponder, and at the relay stations. Thus, the algorithm enables transponder and relay stations phase errors to cancel out, and thereby permits the use of less expensive nonphase stable equipment.

The equations suitable for an inverse hypebolic algorithm of the type with which non-phase stable vehicle transceivers may be used will now be described.

Considering $M$ as a master relay station, $S_1$, $S_2$ and $S_3$ as slave relay stations and $V$ as the vehicle, $\phi_x$ is the phase difference measurement made at any of the relay stations $S_1$, $S_2$ and $S_3$ between two received tones.

The phase bias, is the deviation from 0° phase delay through the vehicle transceiver at a 2,700 hertz frequency.

$x_v$ represents the multipath induced phase error of a path $XY$ which path, for example, may be $MS_1$ the distance between the master relay station and one of the slave relay stations. $x_v$ is the equivalent phase relay of a 2,700 hertz tone having range $XY$.

$$\phi_M = 2MV + \delta + \beta_{MV} + \beta_{VM}$$

$$\phi_{S1} = MV + VS_1 - MS_1 + (\delta + \beta_{MV}) + \beta_{VS_1} - \beta_{MS_1}$$

$$\phi_{S2} = MV + VS_2 - MS_2 + (\delta + \beta_{MV}) + \beta_{VS_2} - \beta_{VS_2}$$

$$\phi_{S3} = MV + VS_3 - MS_3 + (\delta + \beta_{MV}) + \beta_{VS_3} - \beta_{MS_3}$$

Let $R_1 = VS_1$, $R_2 = VS_2$, $R_3 = VS_3$, $R_4 = MV$ $$R_4 = MV = \tfrac{1}{2}(\phi_M - \delta - \beta_{MV} + \beta_{VM})$$

$$R_1 = VS_1 = \phi_{S1} + (MS_1 + \beta_{MS_1}) - \beta_{VS_1} - MV - \delta - \beta_{MV}$$

$$R_2 = VS_2 = \phi_{S2} + (MS_2 + \beta_{MS_2}) - \beta_{VS_2} - MV - \delta - \beta_{MV}$$

$$R_3 = VS_3 = \phi_{S3} + (MS_3 + \beta_{MS_3}) - \beta_{VS_3} - MV - \delta - \beta_{MV}$$

From the above equations, the following algorithm can be derived which can be solved at the central computer of the system at the control center by iteration methods to produce a vehicle location estimate.

$$R_1 - R_2 = (\phi_{S_1} - \phi_{S_2} + MS_1 - MS_2) + (\beta_{MS_1} - \beta_{MS_2}) - (\beta_{VS_1} - \beta_{VS_2})$$

$$R_1 - R_3 = (\phi_{S_1} - \phi_{S_3} + MS_1 - MS_3) + (\beta_{MS_1} - \beta_{MS_3}) - (\beta_{VS_1} - \beta_{VS_3})$$

$$R_2 - R_3 = (\phi_{S_1} - \phi_{S_3} + MS_2 - MS_3) + (\beta_{MS_2} - \beta_{MS_3}) - (\beta_{VS_2} - \beta_{VS_3})$$

$$R_1 - R_4 = (\phi_{S_1} - \phi_M + MS_1) + \beta_{MS_1} + \beta_{VM} - \beta_{VS_1}$$

$$R_2 - R_4 = (\phi_{S_2} - \phi_M + MS_2) + (\beta_{MS_2} + \beta_{VM}) - \beta_{VS_2}$$

$$R_3 - R_4 = (\phi_{S_3} - \phi_M + MS_3) + (\beta_{MS_3} + \beta_{VM}) - \beta_{VS_3}$$

From the above algorithm, it can be seen that the inverse hyperbolic equations can be derived at the central computer using non-phase stable receivers and transmitters at the vehicles thereby greatly reducing the overall system cost when many vehicles are involved, and also obviating any serious calibration problems.

Small multipath induced phase errors in the master station to relay station links are greatly reduced by the diversity reception technique of the present invention which may most effectively utilize predetection combining described with reference to FIG. 3. Although postdetection combining might also be employed in a diversity system, predetection combining results in superior performance in eliminating multipath effects.

The rate of location is enhanced over that which can be achieved with a single UHF radio channel by the use of a duplex UHF radio channel. The relay station transmits the UHF carrier signal at one of two frequencies of the duplex UHF channel and the vehicle transponder transmits its UHF carrier at the other frequency $f_2$ of the duplex channel. This allows the retransmission of the ranging signal from the vehicle simultaneously with reception of the ranging signal from the relay station without mutual interference which cannot be done in a single frequency system. Additionally, the final phase measurements are made at the relay station, and at at the master station, which may also be a relay station, and the transmission of these measurements via telephone links to the control center results in no interference or confusion between the respective phase measurements since each measurement is transmitted on its own telephone link.

Figure 2:
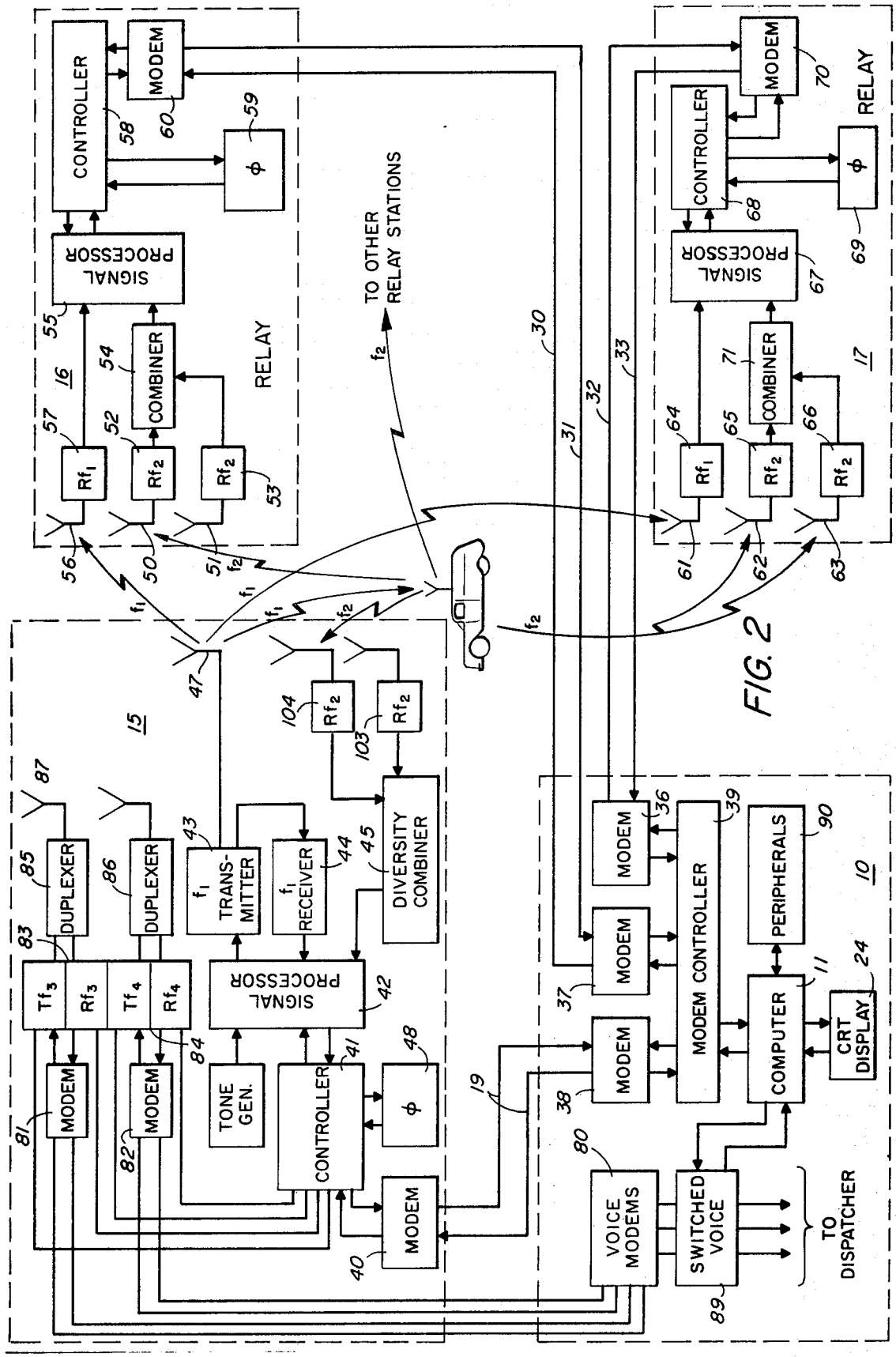
FIG. 2 is a block diagram of a specific embodiment of the present invention.

Referring now to FIG. 2, there is shown a vehicle ranging and control system of the present invention in which a fleet of vehicles is sequentially interrogated from a master relay station 15 under the control of a central computer at a central station 10 with a plurality of relay stations for receiving the vehicle response indicated at 16 and 17. The central location includes a computer 11 selectively connectable to various files, memory and print out indicated generally at 12 and to digital displays 24 of the type disclosed in the patent application of Joseph E. Bryden, previously incorporated herein.

The computer contains sequences of program order words and data representative of the message to be formatted, and may further include a program for automatic rechecking and regulating the system.

Illustratively, computer 11 communicates with one or more of the remote stations 16 and 17 at the master station 15 and others not shown over corresponding data links 30, 31, 32, 33, and 19 comprising telephone lines terminating in corresponding modems 36, 37 and 38 in the modem bank 20. Of course, other modems, not shown, associated with other relay stations are not shown. The modems 36, 37 and 38 in turn terminate in input-output modem controller 21 of the general type described in the patent application of William J. Bickford, previously incorporated herein. The modem controller interfaces computer 11 through appropriate data buffers (not shown).

Control center 10 services a matrix of relay stations throughout a city of interest situated at intervals of, for example, 3 to 7 miles apart, the exact spacing being dependent upon the topography of the area, the noise environment and the availability of appropriate sites. Each relay station is connected with the control center via the telephone land lines as previously described. Once the computer 11 selects a relay station to act as master station for a sector, that station is then commanded to the master mode via the telephone land line associated with that particular relay station and requested to locate the specific vehicles known by the computer to be in the surrounding region for the master station, which knowledge by the computer is based upon continuing location information since the entry of the vehicle into the system. It is to be understood that in the embodiment shown only one relay station is capable of activation into the master mode since to equip all relay stations with such a capability would involve the addition of a transmitter at the frequency $f_1$; however, each relay station could alternatively be equipped as a master station.

Figure 5:
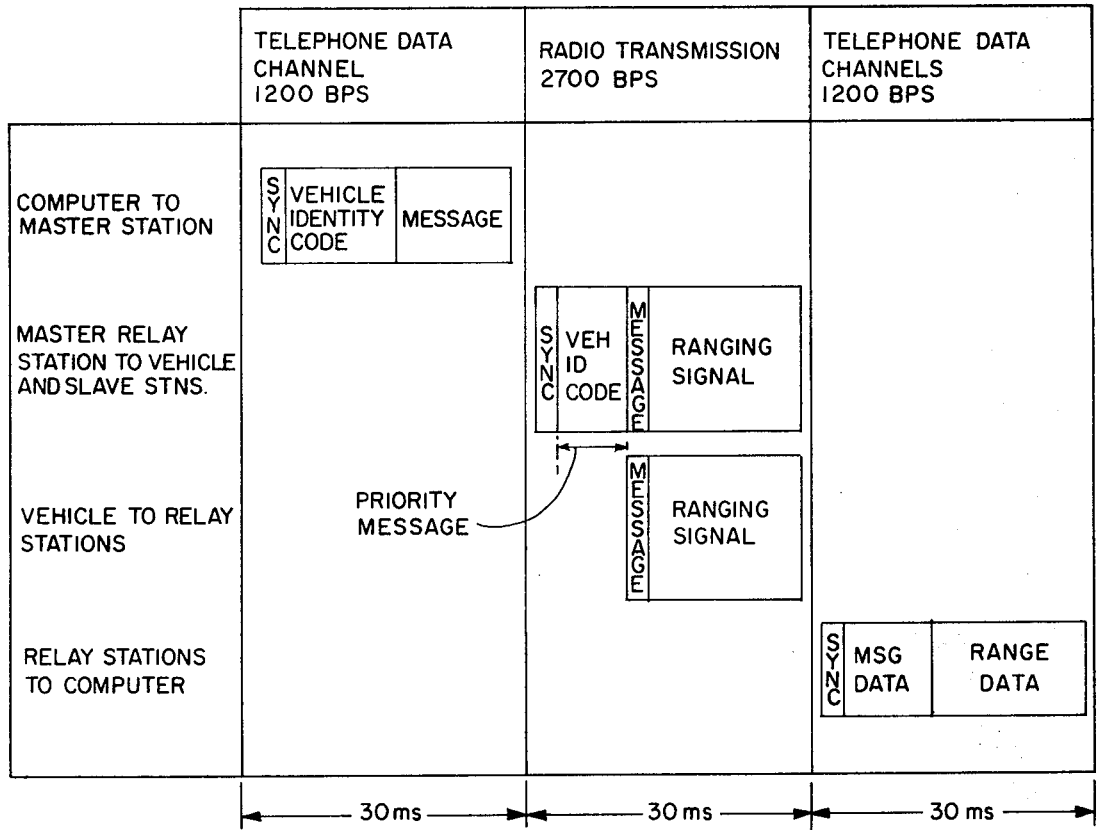
FIG. 5 is illustrative of the composition, sequencing and timing of formatted digital messages transmitted between the system elements of the present invention.

The actual message format of the message sent by the computer to master station 15 is shown in FIG. 5. This message comprises a synchronization portion of three to five bits, a vehicle identity code of, for example, 15 bits plus parity bits and the coded message of five bits and parity. Of course, other message lengths may be used.

The master station transmits series of signals as modulations on the RF carrier, each containing a vehicle identification code and a ranging signal for positional location. Each signal is received by all relay stations and vehicles within range. Signals transmitted by the master station each contain a particular vehicle identity code so that although many vehicles may receive a signal only the specific vehicle being addressed for location will respond to any one particular signal.

The radio signal at frequency $f_1$, the format of which is shown in FIG. 5 is transmitted by the master station to the vehicle and has a format such that synchronization bits, vehicle identity code and the coded message are present along with the ranging tone of, for example, 2,700 hertz modulated onto the $f_1$ carrier. The requisite operational commands are sent via lines 19 from the computer through telephone modem 38 to telephone modem 40 at the master station which feeds a modem controller 41 similar to modem controller 21 at the central station which controller supplies the information from the central location through a signal processor 42 which serves to synchronize the transmission and reception of frequency $f_1$ and the reception of frequency $f_2$ from transmitter 43 for $f_1$ and receiver 44 for $f_1$ and diversity network 45 for $f_2$. Antenna 47 transmits $f_1$ from transmitter 43 while $f_1$ is also coupled to receive 44. Of course, a conventional duplexer and circulator may be used to provide isolation where desired, however, the frequency separation between $f_1$ and $f_2$ is such that a circulator is not required.

During routine location operation, all vehicles in the system are located on a rotational basis. The computer selects a master station to cover a set of sectors and transmits to that station via the telephone lines a series of message location requests for all specific vehicles within those sectors as derived from the computer memory files containing the previous locations. A typical matrix of master and slave stations, for example, may contain 25 relay stations, with each master relay station covering a minimum of four sectors or three slave stations and the master itself. The next relay station in the grid of stations would cover the adjacent four sections and so on thereby minimizing relay station switching operation.

While the actual location operation is as described above, in the event of a request for an emergency location, which can originate from the computer as a result of an emergency message or from one of the dispatchers or by request from the vehicle itself, the routine location operation may be interrupted and a priority message transmitted to the appropriate relay station or master station for transmission of the message and ranging tone to the vehicle for carrying out an emergency location of the vehicle. In the event that a vehicle wishes to communicate routinely with the control center, the operator will enter the coded message he wishes to transmit into the vehicle transponder. In the case of priority or emergency messages to the vehicle, since it is not desirable that the message be delayed even the short time to the normal communication location period for that vehicle, a special emergency priority period may be allocated within each 30 millisecond period allocated to location of each particular vehicle.

It is highly unlikely that a number of vehicles in emergency or priority message situation will each transmit in the same emergency priority time period which would entail more than one vehicle operator pushing an emergency or priority transmit button within the same fixed 30 millisecond period and it is even more unlikely that more than one vehicle would be received by exactly the same relay stations. As long as only one relay station receives the transmission of only one vehicle of those vehicles transmitting, the message is of course sent to the computer. In the unlikely event that two or more vehicles have each transmitted only to the same relay station and the message is garbled because of this, then no computer acknowledgement of reception will be received at the vehicle transponder and automatic retransmission will occur until the emergency priority message has been acknowledged by the computer. This may be accomplished by a routine program. The actual delay in transmission of a priority message when the original priority transmission is garbled, is dependent upon the number of vehicles being located in its position in time with respect to its specific location period. In the case of 500 vehicles being located, the maximum time delay is 15 seconds. For a 1,000 vehicles being located it is 30 seconds and so on. The minimum delay is less than 30 milliseconds. Of course, if additional channels are used, the message delay may be correspondingly reduced.

The relay stations operating in a relay mode receive both the interrogating signal and the vehicle transmission at $f_1$ and $f_2$ respectively. The ranging tone modulated on frequency $f_2$ transmitted from the vehicle is received at relay station 16 via antennas 50 and 51 coupled to diversity receivers 52 and 53 where, after predetection combining at predetection combiner 54, the phase delayed ranging tone is fed to signal processor 55 with the modulation on carrier $f_1$ which is received at antenna 56 and coupled through receiver 57 to signal processor. These phase delay modulations are fed through modem controller 58 to a phase meter 59 where the actual phase measurement is made, coupled back through the controller, put into digital form and modulated onto a 1,200 bit per second telephone channel at modem 60. Delay encoding as used in the present system is well known in the art and, for example, is described in the Proceedings of the IEEE, July 1969, pages 13, 14, to 13, 16, titled *Delay Modulation*.

Relay station 17 is identical to relay station 16 and provides the additional phase measurement required for solution of the location algorithm along with the measurements provided by phase meters 59 of station 16 and 48 of station 15. As in station 16, frequency $f_1$ is received at antenna 61 and coupled through receiver 64 to signal processor 67 where the ranging modulation is extracted together with the frequency $f_2$ ranging modulation which is inputted to the signal processor via combiner 71 which is supplied with the $f_2$ modulation from diversity receivers 65 and 66 supplied by antennas 62 and 63 respectively. This phase information is coupled through controller 68 to the phase meter 69 at which point phase measurements are made, is coupled back through the controller 68 to the telephone modem 70 and is transmitted at 1,200 bits per second as modulation on telephone line 33 to telephone modem 36 at the central station 10 at which point this information is supplied to the computer 11 through modem controller 39 together with the phase measurements taken at the other relay stations in the sectors serviced by particular master and slave stations.

The phase measurement may be accomplished by counting a clock frequency while the signals received from the master station and the vehicle are of opposite polarity. This is the equivalent of an "exclusive OR" function, and may be used rather than the well known "zero crossing" phase measurement method to reduce errors resulting from noise crossings terminating the phase count. The phasemetic itself may be of well known and conventional design.

Of course, voice communication between the control center and the vehicle can be established by means of a coded message requesting it.

A phase shifter, not shown, is included at each relay station receiver to remove any error due to finite processing or signal delay through the receivers. The phase shifter allows the total phase delay through each receiver to be adjusted to a multiple of 180° of phase at 2,700 hertz so that the relay station dual receivers of frequencies $f_1$ and $f_2$ have matched delay. The possibility of an error due to slow variation of phase delay through the receivers between adjustments may be reduced by periodic computer requested calibrations which derive the difference in phase delay through the dual receivers. The phase meters present at the relay stations may be of well known and conventional design with a range of 180° of phase at 2,700 hertz to obviate the possibility of ambiguous range readings due to multiples of 180° of phase which would require correction by additional computer operation. As mentioned above, the phase difference between the ranging tones received at a relay station from the master relay station and from the vehicle is measured by means of a digital phase meter. Although 48 cycles of the 2,700 Hertz ranging tone are transmitted and transponded, only 32 cycles are needed for the measurement. The redundant cycles insure against loss of tone cycle through fading, impulse noise, processing delay, etc. The count is then stored. Since crossings two through zero phase occur at each cycle it can be seen that 32 cycles will give 64 individual counts. Phase measurement operation is designed to insure 64 actual measurements which are added together and divided by 64 to produce an average phase difference measurement.

This count is then transmitted to the computer via the relay station to control center telephone line where it is used in the location processing. Received carrier level and carrier noise ratio credence indications of the received signals may also be sent to the computer as part of the message so that the measurement can be rejected or corrected for signal level effect.

Figure 3:
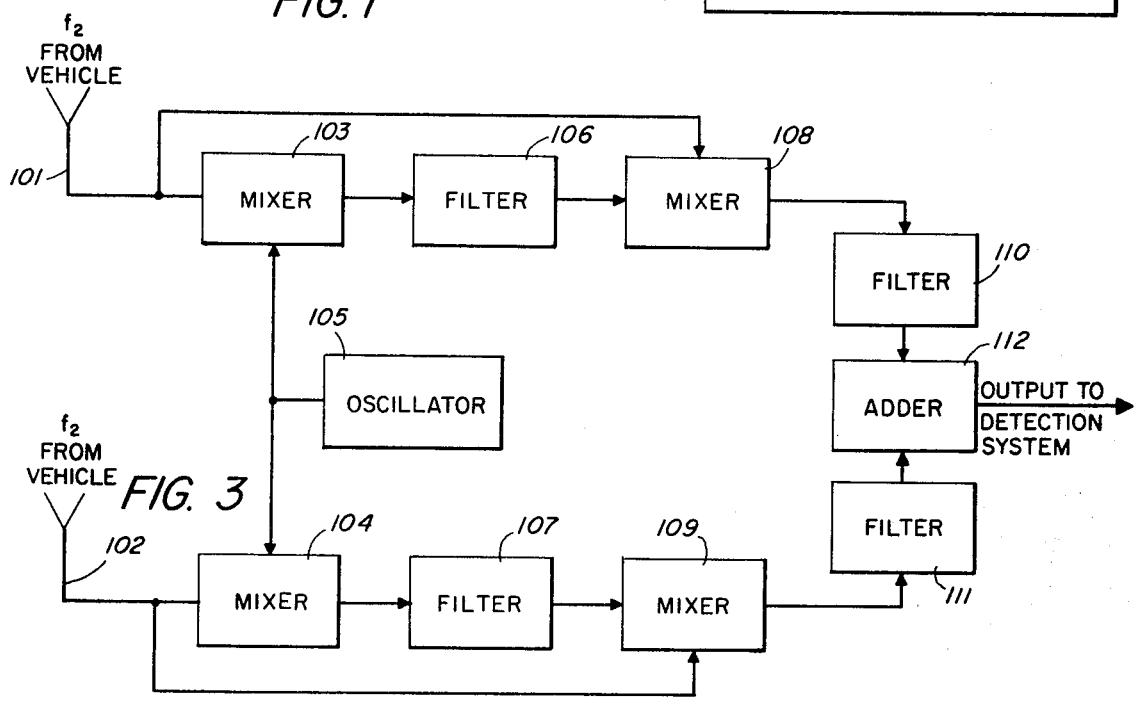
FIG. 3 is a block diagram of the predetection combination technique utilized in the present invention.

Referring now to FIG. 3, the diversity combining predetection combination technique of the present invention is illustrated. The range measurement accuracy is substantially improved by elimination of multipath effects by using diversity reception at the received signal frequency $f_2$ from the vehicle, which may include either predetection or postdetection confirmation. The predetection combination technique being most effective is illustrated. Space or polarization diversity may be employed. The reason for the range accuracy improvement is the reduced modulation phase distortion achieved when two essentially independent signals are combined. The ranging information modulated on frequency $f_2$ from the vehicles is received at two different antennas 101 and 102 and may be amplified before being fed to conventional mixers 103 and 104 which may be heterodyning devices. A common local oscillator 105 is connected to mixers 103 and 104 which produces pairs of intermediate frequency signals from each mixer. Frequency selective filter 106, which can be a well known RLC filter is tuned to the difference frequency output of mixer 103 and a similar frequency selective filter 107 is tuned to the difference frequency output of mixer 104. It should be understood that filters 106 and 107 can be tuned to the sum frequency output of mixers 103 and 104 and the remainder of each channel adapted to run on the sum frequency. These filters improve the rejection of unwanted mixer frequencies. The output of filters 106 and 107 is fed (after additional amplification and filtering if necessary) to mixers 108 and 109, respectively which are linear mixers. The other input signal for mixers 108 and 109 in the received space diversity signals on carrier $f_2$. The output of mixer 108 is fed to a conventional RLC bandpass filter 110 and the output of mixer 109 is fed to a conventional RLC bandpass filter 111. The output of filters 110 and 111 is fed to a conventional adder 112 which provides a signal proportional to the vector sum of the input signals. The predetection combination technique is described in greater detail in the beforementioned patent to W.J. Bickford.

Figure 4:
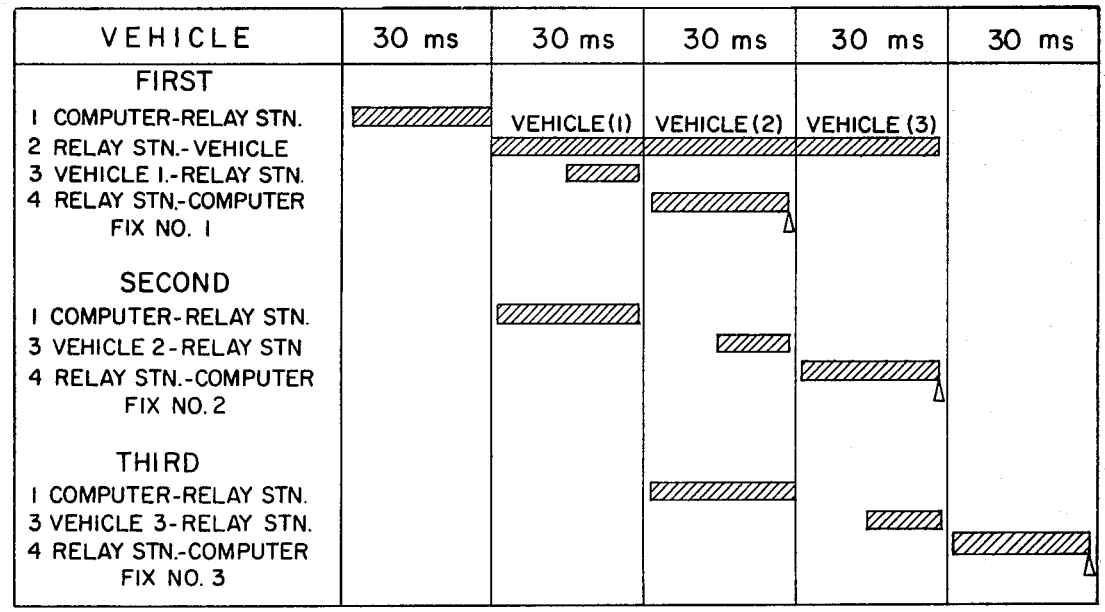
FIG. 4 illustrates the general timing sequence of the present invention.

Referring now to FIGS. 4 and 5, the system operation timing and overlapping message technique for a single location of a vehicle including examples of the message format used to define the communication between system elements is shown.

Computer 11 in communicating with any of the remote relay stations as described above, transmits a message over a telephone data channel having an approximate information capacity of 1,200 bits per second although, of course, other telephone or data transmission lines of higher bit rates may be employed where necessary. The time required for a single location operation may be for example, 90 milliseconds divided into three segments of 30 milliseconds each as illustrated in FIG. 5.

During the first 30 milliseconds, central computer 11 transmits over telephone lines 30 through 35 and over other telephone lines to other relay and master stations not shown, a message formatted as illustrated in FIG. 5. This message is a command to locate specific vehicles known by the computer to be in the surrounding region for the master station. The synchronization bits, vehicle identity code with parity check, and the message as such are sent.

Once having received this message via the telephone land line the master station transmits the message portion of the digitally coded signal as frequency modulation together with a 2,700 hertz ranging tone on the RF carrier at frequency $f_1$ during the second 30 millisecond interval of the 90 millisecond period. This signal is received by the slave stations such as 16 and 17 and any vehicles within range. The vehicle whose identity code is contained in the message will transpond the tone as a frequency modulation on the RF carrier $f_2$ which is then received by the master and slave stations within range. The measurements of phase difference between the tones received from the master station and from the vehicle are made during the second 30 millisecond period. A short coded digital message is also transmitted by the vehicle prior to the ranging tone during this second 30 millisecond period, the message consisting of five data bits and one parity bit although, of course, other message and parity bit lengths may be employed.

During the third 30 millisecond period a message is transmitted by each relay station to the computer via its station-to-control center telephone line and modem interface. This message contains the data from the measurements of phase difference as well as synchronization and parity bits in the coded digital message. It is important that the transmission of the coded digital messages by the vehicle is arranged to occur only in the second 30 millisecond period of a 90 millisecond location period. The coded digital message transmitted by the vehicle on carrier frequency $f_2$ can, as previously discussed, be either routine or priority.

Referring now to FIG. 4, the time interleaving between the transmissions to and from the various relay stations and to and from the vehicle is illustrated. As previously described, the vehicles respond on a frequency other than that which interrogation is made to the vehicles. This allows a vehicle response to occur simultaneously with an interrogating signal to either another vehicle or to the vehicle which is responding.

In single frequency systems of the prior art simultaneous retransmission was impossible because there was no way of distinguishing the interrogating signal from the reply signal; however, the dual frequency time interleaving technique of the present invention allows such simultaneous transmissions and replays. By way of example, an arbitrary 150 millisecond transmission period has been chosen in which the interleaving of the transmission and response between the computer and three relay stations is described. During the first 30 millisecond period the central computer transmits a first cyclic message to a relay station for a first vehicle via telephone data channels.

During the next 30 milliseconds the relay station transmits via a radio link at frequency $f_1$ the interrogating signal to the first vehicle. During this same 30 millisecond period the transponder in the vehicle replies to the relay station after the synchronization and vehicle identity portion of the message are received by the vehicle and the corresponding message and 2,700 hertz ranging tone is transmitted as modulation on frequency $f_2$. Also during this same 30 millisecond period the computer is transmitting a second interrogating message to the relay station via the telephone link. Thus, during the second 30 millisecond period three messages, two of which are interrogatory and one of which is a reply are transmitted, one by telephone link and two by radio.

During the third 30 millisecond period, four messages are simultaneously transmitted. The relay station transmits a communication and ranging signal to the second vehicle at frequency $f_1$, the relay station is responding to the computer telephone data link with the phase and communication information from vehicle one, vehicle two is responding to the relay station at frequency $f_2$ with ranging phase modulation at 2,700 hertz modulated thereon and the computer is transmitting via the telephone link the communication and ranging interrogation message for the third vehicle.

During the fourth 30 millisecond interval, that is, between 90 and 120 milliseconds after the initiation of transmission, the relay station is relaying the interrogating signal at frequency $f_1$ to the third vehicle, the relay station is relaying via the telephone link the phase information from the second vehicle, and the third vehicle is transponding at frequency $f_2$ to the relay station.

During the fifth 30 millisecond interval, that is between 120 and 150 milliseconds, the relay station is relaying via the telephone link the ranging and message information from the third vehicle to the central computer. At the end of the 90, 120 and 150 millisecond intervals, location fixes are obtained upon vehicles one, two and three respectively. These fixes are indicated in FIG. 4 by the triangular symbols.

Of course, provision may be made for voice communication between the vehicle and any of the relay stations, the master station or the control station, if so desired. In FIG. 2, a typical voice communication arrangement is illustrated between the control station and the master relay station in which voice modems 80 are coupled via telephone links to modems 81 and 82 at the master station, which in turn may be used to provide communication to transmitter and receiver pairs 83 and 84 respectively operating at frequencies other than those previously described with respect to the ranging system, for example, $f_3$ and $f_4$. Conventional duplexers 85 and 86 coupled to antennas 87 and 88 provide the necessary communication capability, however, separate antennas may of course be used in place of duplexers if desired. Conventional telephone voice switching circuitry 89 is used to route voice communication both to the dispatcher and through suitable buffer circuitry (not shown) to and from computer 11 if desired.

The vehicle transponders may be of well known and conventional design for receiving coded digital signals of the type described with reference to the IEEE article.

While particular embodiments of the invention have been shown and described, various modifications thereof will be apparent to those skilled in the art and therefore it is not intended that the invention be limited to the disclosed embodiments or to details thereof and departures may be made therefrom within the spirit and scope of the invention as defined in the appended claims.

What is claimed is:

1. In combination:

means for transmission of a substantially continuous wave signal of a first frequency from a first station at a first location;

at least one means at a second location for receiving said first frequency substantially continuous wave signal and for transmitting a signal at a second frequency;

a plurality of additional stations at other locations for receiving said first and second frequency signals and for generating a measurement indicative of the time difference between said first and second frequency signals; and means for receiving said measurements from said plurality of additional stations for determining the position of said means at said second location.

2. A combination in accordance with claim 1 wherein at least one of said receiving means includes a predetection signal combination network.

3. A combination in accordance with claim 1 wherein at least one of said receiving means includes a postdetection signal combination network.

4. In combination:
means for transmission of a substantially continuous wave signal of a first frequency from a first station at a first location, at least one means at a second location for receiving said first frequency signal and for transmitting a substantially continuous wave signal at a second frequency in response thereto;

a plurality of additional stations at other locations for receiving said first and second frequency signals and for generating a phase measurement therefrom; and computing means for receiving said phase measurements from said plurality of additional stations for determining the position of said transponder.

5. A combination in accordance with claim 4 wherein said second frequency signal is received at said first station and means at said first station for generating a phase measurement from said first and second frequency signals which is supplied to said computing means with the phase measurements from said plurality of additional stations for determining the position of said transponder.

6. In combination:
means for transmission of a signal carrier of a first frequency from a first station at a first location;

means for frequency modulating said carrier at a predetermined modulation frequency;

at least one transponder means at a second location for receiving said first frequency signal and for transmitting a signal at a second frequency in response thereto;

means at said second location for frequency modulating said first frequency signal at the same modulation frequency as said first frequency signal is modulated;

a plurality of additional stations at other locations for receiving said first and second frequency carrier signals with said modulation frequency modulated thereon and for generating a phase measurement between the two received modulation signals; and computing means for receiving the phase measurement from said plurality of additional stations for determining the position of said transponder.

7. A combination in accordance with claim 6 in which $f_1$ and $f_2$ are in the UHF region.

8. A phase ranging system comprising a master station, a plurality of phase stations, first transmission means at said master station for transmitting a modulated substantially continuous wave signal at a first frequency, transponder means at at least one mobile vehicle for receiving said frequency signal and for transmitting a modulated substantially continuous wave signal at a second frequency in response thereto, means at said master station and at said slave stations for receiving said first and second frequency modulated signals;

means at said master station and at said slave stations for phase comparing the modulation on said first frequency and on said second frequency to obtain a plurality of distance measurements of the vehicle from the respective master and slave stations; and means for transmitting the plurality of phase measurements to a central computing means for determining the position of said mobile vehicle.

9. A phase ranging system comprising a master station, a plurality of phase stations, first transmission means at said master station for transmitting a modulated signal at a first frequency, transponder means at at least one mobile vehicle for receiving said first frequency signal and for transmitting a modulated signal at a second frequency in response thereto, means at said master station and at said slave stations for receiving said first and second frequency modulated signals;

means at said master station and at said slave stations for phase comparing the modulation on said first frequency and on said second frequency to obtain a plurality of distance measurements of the vehicle from the respective master and slave stations;

means for transmitting the plurality of phase measurements to a central computing means for determining the position of said mobile vehicle; and said means for transmission of said phase measurements to said central control means comprising telephone lines.

10. In combination, a ranging and communication system comprising:
a central processor;
a plurality of remote relay stations;
at least one vehicle equipped with a transponder;
means at at least one of said remote relay stations for transmitting an omnidirectional signal having coded indicia and a ranging signal modulated thereon;

means at said transponder responsive only to said coded indicia for generating a coded reply signal including a ranging signal within a predetermined time after receipt of said transmitted signal;

receiving means at each of said plurality of remote relay stations for detecting and decoding said signal transmitted from said transponder and said omnidirectional signal;

means at each of said plurality of remote relay stations for generating a measurement indicative of the time difference between the transmission from said relay station and the transmission from said transponder;

means for transmitting said detected and decoded signals from said plurality of relay stations to the central processor.

11. A combination phase ranging and communication system in accordance with claim 10 wherein said omnidirectional signal transmitted from at least one relay station includes a carrier at a first frequency with a range tone modulated thereon and said transponder signal from said vehicle generated in response to the receipt of said omnidirectional signal comprises a carrier at a second frequency with a ranging tone modulated thereon.

12. A combination phase ranging and communication system in accordance with claim 11 wherein the portion of said first and said second modulated signals containing the range tone modulated on said respective first and second frequency signals is transmitted simultaneously from said remote relay station and from said vehicle.

13. A combination phase ranging and communication system in accordance with claim 11 wherein said omnidirectional signal additionally contains a vehicle identification code modulated thereon such that only the transponder on the particular vehicle for which said identity code is intended will transpond in response to said omnidirectional signal.

14. A combination phase ranging and communication system in accordance with claim 13 wherein said second frequency signal containing the range tone modulated thereon is transmitted simultaneously with said first omnidirectional signal having said range tone modulated thereon.

15. A combination phase ranging and communication system in accordance with claim 13 further comprising phase measuring means at each of said remote relay stations for measuring the phase difference between the ranging tones modulated on said first and second frequency signals to derive positional information as to the location of said vehicle; and
means for transmission of said plurality of phase measurements to said central processor for computation of the vehicle location.

16. A combination phase ranging and communication system in accordance with claim 15 wherein said means for transmission of said phase information from the plurality of relay stations to the central processor is a plurality of telephone data channels and further including a telephone data channel for transmission of control signals from the central processor to said remote relay station transmitting said omnidirectional signal.

17 A combination phase ranging and communication system in accordance with claim 16 wherein said central processor comprises a digital computer.

18. A phase ranging system for command and control of a fleet of mobile vehicles in a high multipath signal clutter environment such as a city comprising:
a plurality of remote relay stations for transmission of an omnidirectional frequency modulated substantially continuous wave carrier of a first frequency;
a plurality of transponders located at different vehicles;
each of said transponders being operable upon receipt of said first frequency signal for activating means for transmitting a frequency modulated substantially continuous wave carrier at a second frequency; and
means at said plurality of remote relay stations for receiving said first and second frequency modulated signals and for deriving a phase measurement therefrom indicative of the location of said transponders.

19. A phase ranging system for command and control of a fleet of mobile vehicles in a high multipath signal environment such as a city in accordance with claim 18 further including diversity reception means for diversity reception of said transponded signals, including two receivers for receiving said second frequency signal; and a predetection combiner fed with the detected modulation on said second frequency signal from both of said receivers.

20. A phase ranging system for command and control of a fleet of mobile vehicles in a high multipath signal clutter environment such as a city comprising:
a plurality of remote relay stations for transmission of an omnidirectional frequency modulated carrier of a first frequency;
a plurality of transponders located at different vehicles;
each of said transponders being operable upon receipt of said first frequency signal for activating means for transmitting a frequency modulated carrier at a second frequency;
means at said plurality of remote relay stations for receiving said first and second frequency modulated signals and for deriving a phase measurement therefrom indicative of the location of said transponders; and
said frequency modulated carrier transmitted from said plurality of remote relay stations having modulated thereon a formatted message having a synchronization portion, a vehicle code identification portion, a coded data portion, and a ranging signal such that only the particular vehicle transponder containing a corresponding vehicle identification code will transpond in response to said transmission.

21. A system in accordance with claim 20 in which said formatted message is a digital code modulated onto said carrier.

22. A system in accordance with claim 21 in which said second frequency modulated carrier transmitted from said transponder contains a coded digital message and a ranging tone modulated thereon is transmitted simultaneously with the transmission of the portion of said formatted message modulated on said first frequency carrier that contains the digitally coded message and the ranging tone from said relay station.

23. A phase ranging system in accordance with claim 22 wherein said vehicle code identification portion of said first frequency signal keys on the transponder responsive to that particular vehicle identity code to transpond simultaneously with the remainder of the message at said first frequency, said transponder frequency being at said second frequency.

24. A phase ranging system for use with a fleet of mobile surface vehicles comprising:
a central processor including a digital computer;

a plurality of remote relay stations at least one of which contains means for transmission of an omnidirectional interrogation and ranging signal at a first frequency;

means for supplying said omnidirectional signal transmitting relay station with control signals including at least one telephone data channel between said central processor and said transmitting relay station;

at least one transponder located on a surface vehicle for transmission of a reply signal at a second frequency in response to said first frequency interrogating signal;

means at each of said relay stations for measuring the phase difference between said first and second frequency signals for determining the position of said transponder;

wherein the improvement comprises:

the transmitting and receiving means at said plurality of relay stations and said vehicle transponder comprising non-phase stable components such that said phase measurements are independent of phase variations inherent in said receivers and transmitters at said plurality of relay stations and at said transponder in the vehicle.

* * * * *